United States Patent
Davis et al.

(10) Patent No.: US 9,624,343 B2
(45) Date of Patent: Apr. 18, 2017

(54) ZINC CATALYST/ADDITIVE SYSTEM FOR THE POLYMERIZATION OF EPOXIDE MONOMERS

(71) Applicant: Dow Global Technologies LLC, Midland, MI (US)

(72) Inventors: Anna V. Davis, Midland, MI (US); Peter N. Nickias, Midland, MI (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 15/035,407

(22) PCT Filed: Nov. 18, 2014

(86) PCT No.: PCT/US2014/066076
§ 371 (c)(1),
(2) Date: May 9, 2016

(87) PCT Pub. No.: WO2015/077208
PCT Pub. Date: May 28, 2015

(65) Prior Publication Data
US 2016/0289380 A1    Oct. 6, 2016

Related U.S. Application Data

(60) Provisional application No. 61/907,409, filed on Nov. 22, 2013.

(51) Int. Cl.
C08G 65/12 (2006.01)
C08G 65/26 (2006.01)
(Continued)

(52) U.S. Cl.
CPC ........ C08G 65/12 (2013.01); B01J 31/0212 (2013.01); C08G 65/10 (2013.01); C08G 65/266 (2013.01);
(Continued)

(58) Field of Classification Search
CPC ...................................................... C08G 65/12
(Continued)

(56) References Cited

U.S. PATENT DOCUMENTS 2,969,402 A    1/1961    Hill et al.
3,432,445 A    3/1969    Osgan et al.
(Continued)

FOREIGN PATENT DOCUMENTS

DE    1667275    3/1972
EP    0104309 A2    4/1984
(Continued)

OTHER PUBLICATIONS

M. Osgan, Bimetallic Oxo-Alkoxides as Catalysts for the Insertion Polymerization of Epoxides, Polymer Letters, 1967, vol. 5, pp. 789-792.

(Continued)

*Primary Examiner* — Duc Truong

(57) ABSTRACT

The present invention concerns a catalyst formulation comprising: (a) a Zn catalyst comprising a Zn compound having alcoholate ligand(s) derived from one or more polyols, and (b) a catalyst additive comprising a metal compound (i) having alcoholate ligand(s) derived from one or monohydric alcohol wherein the metal is selected from: (I) group 2 metals, preferably Mg, Ca, Sr, and Ba, more preferably Mg, (II) Li, and (III) combinations of at least two metals selected from (I) and (II). The present invention also relates to a process for polymerizing an epoxide monomer, preferably ethylene oxide, comprising carrying out the process in the presence of the catalyst formulation.

13 Claims, 1 Drawing Sheet

(51) Int. Cl.
*C08G 65/10* (2006.01)
*B01J 31/02* (2006.01)

(52) U.S. Cl.
CPC ....... *C08G 65/269* (2013.01); *C08G 65/2648* (2013.01); *C08G 65/2651* (2013.01); *B01J 2231/14* (2013.01)

(58) Field of Classification Search
USPC ........................................................ 528/413
See application file for complete search history.

(56) References Cited

U.S. PATENT DOCUMENTS

| | | |
|---|---|---|
| 3,542,750 A | 11/1970 | Tomomatsu |
| 3,607,785 A | 9/1971 | Osgan et al. |
| 3,697,496 A | 10/1972 | Ueno et al. |
| 3,766,091 A | 10/1973 | Vandenberg |
| 4,375,564 A | 3/1983 | Edwards |
| 4,465,877 A | 8/1984 | Edwards |
| 4,667,013 A | 5/1987 | Reichle |
| 5,326,852 A | 7/1994 | Fujikake et al. |
| 6,979,722 B2 | 12/2005 | Hamamoto et al. |
| 2006/0036066 A1 | 2/2006 | Izumi |

FOREIGN PATENT DOCUMENTS

| | | |
|---|---|---|
| EP | 0239973 A2 | 10/1987 |
| GB | 875954 | 8/1961 |
| GB | 1197986 | 7/1970 |

OTHER PUBLICATIONS

V. Rejsek et al., Polymerization of ethylene oxide initiated by lithium derivatives via the monomer-activated approach, Polymer, 2010, 51, pp. 5674-5679.

ZINC CATALYST/ADDITIVE SYSTEM FOR THE POLYMERIZATION OF EPOXIDE MONOMERS

FIELD

The present invention relates to a new catalyst formulation comprising a zinc alcoholate catalyst in combination with a metal alcoholate additive. The catalyst formulation can be used to polymerize an epoxide monomer, for example ethylene oxide.

BACKGROUND

Many catalysts are known for the ring opening polymerization of epoxide monomers such as ethylene oxide. Examples of catalysts systems that are used for the industrial-scale production of poly(ethylene oxide) include calcium-based and zinc-based types of catalysts.

Alkylene oxide polymerizations employing a zinc-based catalyst are disclosed in the following references:

EP 0 239 973 A2 relates to zinc alkoxide and zinc aryloxide catalysts prepared from the reaction of a hydrocarbyl compound of zinc with a dispersion of a polyol in an inert medium. It is taught that the use of a dispersion aid such as fumed silica, magnesia or alumina and a nonionic solvent are critical to achieving good dispersion of the polyol in the inert medium. In this way fine catalyst particles are created. Preferred are linear polyols having from 2 to 6 carbon atoms in the alkane chain (most preferred having 4 carbon atoms) or a cycloalkane diol having 5 or 6 ring carbon atoms. Dispersion prepared catalysts are useful in the polymerization of cyclic alkylene oxides, e.g. ethylene oxide and propylene oxide, to produce high molecular weight polymers and copolymers.

U.S. Pat. No. 4,667,013 A describes as process for polymerizing alkylene oxides in the presence of a catalyst dispersion similar to that in EP 0 239 973 A2 above wherein a hydrogen-containing chain transfer agent having a $pk_a$ value of from 9 to 22 is added to the polymerizing mixture to control the molecular weight of the resulting polymer. The chain transfer agent is preferably an alkanol (aliphatic alcohol) having from 1 to 16 carbon atoms.

U.S. Pat. No. 6,084,059 A details the preparation of metal alcoholate catalysts (including zinc alcoholates) wherein an organometallic compound is reacted with water or a active-hydrogen-containing compound such as an aliphatic polyol using a micelle or reversed-micelle technique facilitated by an ionic surfactant. The use of anionic surfactants is said to be most effective at promoting formation of micelles or reversed micelles which are subsequently reacted with the organometallic reagent such as diethylzinc to form an especially active catalyst. It is taught that the use of dispersion promoters such as fumed silica is not essential.

U.S. Pat. No. 5,326,852 A concerns the production of alkylene oxide polymers in the presence of a catalyst which is obtained by first reacting a hydrocarbyl compound of zinc with an aliphatic polyhydric alcohol, then reacting the product with a monohydric alcohol having 1 to 6 carbon atoms and finally applying a heat treatment at 80 to 200° C.

U.S. Pat. No. 6,979,722 B2 teaches the polymerization of an alkylene oxide in the presence of a catalyst in a branched aliphatic hydrocarbon solvent having 5 to 7 carbon atoms wherein the catalyst is a zinc compound obtained by the reaction of an organic zinc compound and an alcohol. In the example the catalyst is prepared by first reacting diethyl zinc with 1,4-butanediol and then with ethanol.

Catalyst systems for the alkylene oxide polymerization comprising Zn in combination with an additional metal are also known:

Polymer Letters, Vol 5, pp. 789-792 (1967) concerns bimetallic μ-oxo-alkoxides as catalysts for the polymerization of epoxides. One exemplary catalyst is $Al_4Zn_2O_5(OC_4H_9)_6$ which is used in the polymerization of propylene oxide. There is no mention of zinc alcoholates derived from polyols.

U.S. Pat. No. 3,607,785 A and DE 1 808 987 A describe the preparation of a catalyst by first reacting an Al alkoxide with Zn acetate and then contacting the resulting catalyst with a primary alcohol $RCH_2OH$. There is no mention of zinc alcoholates derived from polyols. In the examples, the catalyst is used to polymerize propylene oxide.

U.S. Pat. No. 3,459,685 A teaches the polymerization of alkylene oxides with a catalyst system of a polymeric Al alcoholate and an organometallic compound, for example methyl zinc phenoxide is mentioned. There is no mention of zinc alcoholates derived from polyols.

U.S. Pat. No. 3,542,750 A is directed to the polymerization of alkylene oxides with a catalyst system of (a) the condensation product of Al hydroxide with an Al alcoholate and (b) an organometallic compound, for example methyl zinc phenoxide. There is no mention of zinc alcoholates derived from polyols.

DE 1 667 275 A and GB 1,197,986 A disclose a catalyst composition for the polymerization of alkylene oxide which composition comprises the reaction product of a partially hydrolyzed Al alkoxide and a group II or III organometallic compound. The organometallic compound is preferably diethyl zinc. There is no mention of zinc alcoholates derived from polyols.

DE 1 937 728 A and relates to a process for polymerizing alkylene oxide by contacting it with a catalyst prepared by reacting (1) an Al alkoxide with (2) phosphoric acid or an phosphoric acid monoester or diester, (3) an aliphatic alcohol and/or (4) a group II or III organometallic compound such as for example diethyl zinc. There is no mention of zinc alcoholates derived from polyols.

Zinc-based systems are also described as catalysts for the addition reaction of alkylene oxides with alkanols. U.S. Pat. No. 4,375,564 A is directed to the preparation of low molecular weight alkanol alkoxylates having 1 to 30 alkylene oxide units. The catalyst system employed is a combination of a first component of a soluble basic compound of Mg and a second component of a soluble basic compound of an element selected from various metals including Zn. The preferred Mg compounds are Mg alkoxides, preferably having 1 to 30 carbon atoms. The preferred second component is a metal alkoxide, preferably having 1 to 30 carbon atoms, more preferably 1 to 6 carbon atoms, most preferred 2 or 3 carbon atoms. Alcoholates derived from polyols are not mentioned.

The problem addressed by the present invention is to provide a new catalyst formulation that allows for the polymerization of epoxide monomers such as ethylene oxide to access a greater range of product polymer molecular weights including both higher and lower molecular weights than would be achievable with a zinc alkoxide catalyst alone.

SUMMARY

The problem is solved by a catalyst formulation comprising:
(a) a Zn catalyst comprising a Zn compound having alcoholate ligand(s) derived from one or more polyols, and
(b) a catalyst additive comprising a metal compound (i) having alcoholate ligand(s) derived from one or monohydric alcohol wherein the metal is selected from:
  (I) group 2 metals, preferably Mg, Ca, Sr, and Ba, more preferably Mg,
  (II) Li, and
  (III) combinations of at least two metals selected from (I) and (II).

The present invention also relates to the use of the above defined Zn catalyst in combination with the above defined catalyst additive in the polymerization of an epoxide monomer, preferably ethylene oxide.

In another aspect the present invention is directed to a process for polymerizing an epoxide monomer, preferably ethylene oxide, comprising carrying out the process in the presence of the above defined Zn catalyst and the above defined catalyst additive.

DETAILED DESCRIPTION

Figure 1:
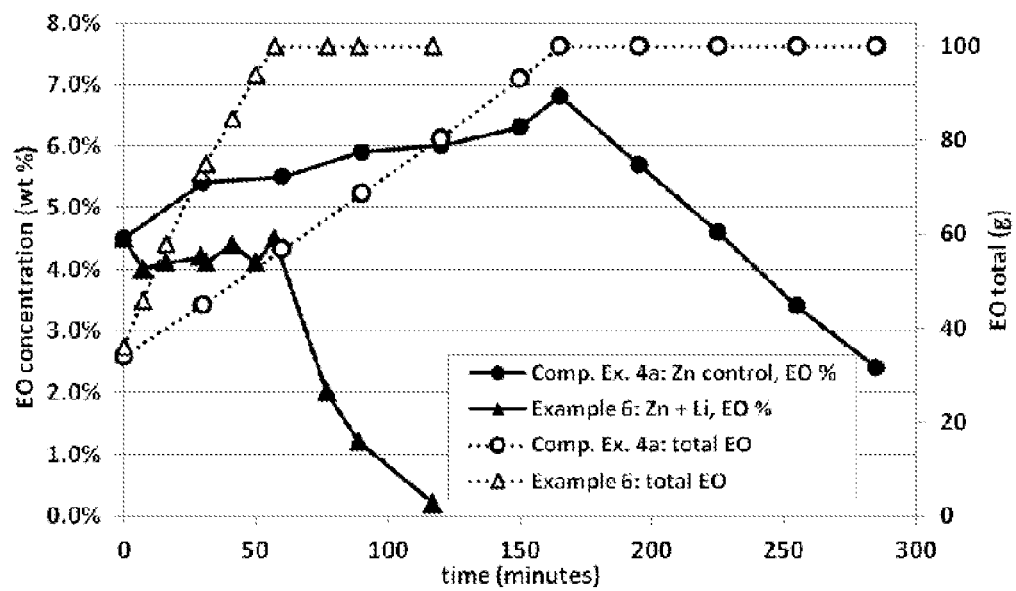
FIG. 1 and FIG. 2 illustrate the EO polymerizations described in Examples 6 and 5 in comparison to Comparative Example 4a and 4b, respectively.

The inventive catalyst formulation comprises (a) a Zn catalyst component and (b) a catalyst additive component which comprises a metal compound (i) as defined above and optionally (ii) an alcohol and/or water.

The terms "Zn compound" and "metal compound" as used herein are not restricted to a certain type of bonding between the metal and the "ligand(s)" and include coordination compounds, ionic compounds and covalent compounds with no definitive distinction between each type of bonding. In the same way, the terms "Zn alcoholate", "Zn complex", "metal alcoholate", and "metal complex" are not restricted to compounds having a certain type of bonding between the metal and the "ligand(s)" and the bonds may have coordinative, ionic and/or covalent character. Accordingly, the term "ligand" is not restricted to true ligands in the narrower sense that are bonded to a central metal atom or ion by coordinative bonding to form a true complex compound, but the term "ligand" is herein used to describe the moiety that is bound to the metal by bonds that may have coordinative, ionic and/or covalent character.

The Zn catalyst (a) comprises a Zn compound having alcoholate ligand(s) derived from one or more polyols (polyhydric alcohols). The Zn compound is typically selected from:
(a1) a Zn alcoholate of one or more polyols, and
(a2) a heteroleptic Zn alcoholate of one ore more polyols and one or more monohydric alcohols and/or water.

The polyol from which the alcoholate ligand(s) is/are derived is typically a diol although higher polyols such as triols, e.g. glycerine, may also be suitable. The polyol, preferably diol, is preferably aliphatic or cycloaliphatic (preferably having 5 or 6 ring carbon atoms) or mixed aliphatic/cycloaliphatic comprising both aliphatic and cycloaliphatic moieties (preferably having 5 or 6 ring carbon atoms). In other embodiments the polyol, preferably diol, is an aromatic polyol including mixed aliphatic/aromatic polyols comprising both aliphatic and aromatic moieties. The polyol, preferably diol, may comprise a hydrocarbon backbone with heteroatoms such as O and/or Si (e.g. polyether polyols such as polyalkylene polyols) in its backbone or heteroatoms such as O, Si and/or halogen, e.g. F, as part of functional groups (e.g. methoxy or trifluoromethyl groups) pendant from the backbone. Typically, the Zn compound has alcoholate ligand(s) derived from one or more alkanediols (which can be straight-chain or branched). In preferred embodiments the diol, preferably the alkanediol, has 2 to 8 carbon atoms directly linking the oxygen atoms of the hydroxyl groups, more preferably 2 to 6 carbon atoms directly linking the oxygen atoms and most preferably 4 carbon atoms directly linking the oxygen atoms. Illustrative examples of suitable diols include ethylene glycol; diethylene glycol; triethyleneglycol; 1,2-propanediol; 1,3-propanediol; 1,4-butanediol; 1,3-butanediol; 1,5-pentanediol; 1,6-hexanediol; 1,2-cyclopentanediol (cis- and trans-); 1,2-cyclohexanediol (cis- and trans-); 1,2-cyclohexanedimethanol (cis- and trans-); 1,2-benzenedimethanol; (2,5-hexanediol (RR-, RS-, and SS-); 2,5-dimethyl-2,5-hexanediol (RR-, RS-, and SS-); with 1,4-butanediol being especially preferred.

The polyol-derived alcoholate ligand(s) of the Zn compound constituting the Zn catalyst (a) (specifically including the Zn alcoholate (a1) and the heteroleptic Zn alcoholate (a2)) can be derived from a single polyol or a mixture of at least two different polyols. Accordingly, the Zn alcoholate (a1) can either be a homoleptic Zn alcoholate only comprising one type of alcoholate ligand(s) or a heteroleptic Zn alcoholate comprising at least two types of alcoholate ligands derived from at least two different polyols, typically two different diols. In preferred embodiments the Zn compound (including the Zn alcoholate (a1) and the heteroleptic Zn alcoholate (a2)) has alcoholate ligand(s) that are derived from a single polyol, typically a single diol.

As regards the Zn alcoholate (a1), it is a homoleptic or heteroleptic Zn alcoholate of any of the polyols as defined above including the preferred embodiments. Typically, the Zn alcoholate (a1) is homoleptic.

In embodiment (a2), the heteroleptic Zn alcoholate comprises alcoholate ligand(s) derived from one or more monohydric alcohols and/or water in addition to alcoholate ligand(s) derived from polyol(s) as defined above including the preferred embodiments. In preferred embodiments, (a2) is heteroleptic Zn alcoholate of one ore more polyols and one or more monohydric alcohols, i.e. the heteroleptic Zn alcoholate (a2) comprises alcoholate ligand(s) derived from one or more polyols and alcoholate ligand(s) derived from one or more monohydric alcohols. Typically, the monohydric alcohol is a monohydric aliphatic alcohol including monohydric halosubstituted aliphatic alcohols. Preferably, the monohydric alcohol is an alkanol (which can be straight-chain or branched), more preferably a $C_1$ to $C_{10}$ alkanol, and most preferably a $C_1$ to $C_4$ alkanol. Lower alkanols such as $C_1$ to $C_4$ alkanols are advantageous because they are volatile and can be easily removed from the Zn catalyst during preparation. Illustrative examples of suitable monohydric alcohol from which the alcoholate ligand(s) in the heteroleptic Zn alcoholate (a2) is/are derived include methanol; ethanol; 1-propanol; 2-propanol; 1-butanol; 2-butanol; tert-butyl alcohol; iso-butyl alcohol; 1-pentanol; 2-pentanol; 3-pentanol; 1-hexanol; 2-hexanol; 3-hexanol; 2-ethyl hexanol; 1-heptanol; 2-heptanol; 3-heptanol; 4-heptanol; 4-methyl-3-heptanol; 2,6-dimethyl-4-heptanol; 1-octanol; 2-octanol; 3-octanol; 4-octanol; 1-methoxy-2-propanol; cyclohexanol;

4-tert-butyl-cyclohexanol (cis- and trans-); 2,2,2-trifluoroethanol; and 1,1,1-trifluoro-2-propanol, ethanol being especially preferred. The monohydric alcoholate ligand(s) of the heteroleptic Zn alcoholate (a2) can be derived from a single monohydric alcohol or a mixture of at least two different monohydric alcohols. If water is contained in the heteroleptic Zn alcoholate (a2) it is believed that it is incorporated as a hydroxide, such as a terminal hydroxide or as an oxide which may bridge two zinc centers. Preferably, the monohydric alcoholate ligand(s) of the heteroleptic Zn alcoholate (a2) are derived from a single monohydric alcohol, more preferably from ethanol. In most preferred embodiments the Zn catalyst (a) is a heteroleptic Zn alcoholate (a2) of 1,4-butanediol and a $C_1$ to $C_4$ alkanol such as ethanol.

The structures of Zn compounds (a1), (a2), and (a3) including those preferred Zn compounds mentioned above are often complex and difficult to resolve. This especially applies to the heteroleptic Zn complexes. Zn complexes having alcoholate ligands are frequently dimeric, oligomeric or even polymeric in structure with sometimes poorly defined structures and may experience transformations between different structures. Bridging of two Zn atoms by one oxygen is known to occur. Thus, the Zn compounds (a1), (a2), and (a3) described herein explicitly include monomeric, dimeric, oligomeric and polymeric species. As regards heteroleptic Zn alcoholate (a2) (e.g. derived from one diol and one monohydric alcohol or two different diols and one monol, or one diol and two different monohydric alcohols), it is possible that the product may contain a combination of heteroleptic and homoleptic Zn alcoholates.

The Zn catalyst (a) of the present invention may comprise one single Zn compound having alcoholate ligand(s) derived from one or more polyols, preferably selected from those Zn compounds (a1) and (a2) as described above, or a mixture of at least two different Zn compounds, preferably selected from those Zn compounds (a1) and (a2) as described above.

In some embodiments the Zn catalyst (a) comprises a Zn alcoholate (a1) of one or more polyols as described above and a Zn alcoholate (a3) of one or more monohydric alcohols wherein the monohydric alcohols are as defined above for the heteroleptic Zn alcoholate (a2). In these embodiments the Zn alcoholate (a1) of one or more polyols and the Zn alcoholate (a3) of one or more monohydric alcohols are often combined with a heteroleptic Zn alcoholate (a2) of one or more polyols and one or more monohydric alcohols wherein the alcoholate ligand(s) are derived from the same polyol(s) and monohydric alcohol(s) as in the Zn alcoholate (a1) of one or more polyols and the Zn alcoholate (a3) of one or more monohydric alcohols.

Preparation methods for the Zn compounds (a1), (a2), and (a3) have been described previously, and a range of reagent stoichiometries, order of addition, and reaction temperature conditions are reported to produce these compounds.

The Zn alcoholates (a1) of the present invention are typically produced by reacting a dihydrocarbyl Zn compound with one or more polyols as specified above. The dihydrocarbyl zinc compounds are preferably the alkyls and aryls of the general formula $R_2Zn$ in which R is (1) an alkyl group containing from 1 to 8 carbon atoms, preferably 1 to 6 carbon atoms, and most preferably 2 or 3 carbon atoms, or (1) phenyl or naphthyl or alkyl-substituted phenyl or naphthyl groups in which the alkyl groups contain from 1 to 4 carbon atoms, preferably 1 to 3 carbon atoms, or (3) cycloalkyl groups containing from 4 to 6 ring carbon atoms; or (iv) the dicyclopentadienyl group. Illustrative thereof are dimethylzinc, diethylzinc, di-n-propylzinc, di-isopropylzinc, dibutylzinc (di-n-butylzinc, di-isobutylzinc, di-t-butylzinc), dipentlyzinc, dihexyl- and diheptyl- and dioctylzinc, di-2-ethylhexylzinc, diphenylzinc, ditolylzinc, dicyclobutylzinc, dicyclopentylzinc, di-methylcyclopentylzinc, dicyclohexylzinc, methyl phenylzinc, methyl tolylzinc, methyl naphthylzinc, and ethyl phenylzinc. The nature of the zinc compounds is not critical but those possessing some solubility in the reaction medium employed is advantageous. The use of a linear dialkylzinc as the starting material for the Zn alkoxide preparation is preferred, diethyl zinc being most preferred. Exemplary preparation routes to Zn alcoholates (a1) are taught in EP 0 239 973 A2, U.S. Pat. Nos. 5,326,852 A and 6,084,059 A.

The heteroleptic Zn alcoholates (a2) of the present invention are typically prepared by reacting a dihydrocarbyl Zn compound as described above with one or more polyols as specified above and one or more monohydric alcohols as specified above. Although it is preferred to react first the dihydrocarbyl Zn compound with the polyol(s), followed by a reaction with the monohydric alcohol(s), the order of reaction may be inverted or a mixture of all three components may be reacted simultaneously. Regardless of how the components are reacted the reaction can be completed by a heat treatment step such as at 80 to 200° C. for 5 to 180 min which is typically carried out while distilling off the unreacted alcohols. The equivalent ratio of polyol to dihydrocarbyl Zn compound is typically 0.2:1 to 1.1:1 and preferably 0.5:1 to 0.95:1. The equivalent ratio of monohydric alcohol to dihydrocarbyl Zn compound is typically at least 0.1:1 and preferably 0.1:1 to 1.5:1. For non-volatile monohydric alcohols, stoichiometry should be carefully controlled to limit excess alcohol relative to zinc-C bonds. A corresponding preparation method of heteroleptic Zn alcoholates (a2) is taught in more detail in U.S. Pat. Nos. 5,326,852 A. 6,979,722 B2 describes in Example 1 the preparation of a heteroleptic Zn alcoholate (a2) from diethylzinc (1.0 molar equivalents), 1,4-butanediol (0.8 molar equivalents), and ethanol (1.3 molar equivalents) in hydrocarbon solvent. The final catalyst is a white slurry.

The Zn alcoholates (a3) of one or more monohydric alcohols are typically produced in a manner similar to that described for compounds (a2) with a stoichiometry of 2.0 equivalents of monohydric alcohol to dialkylzinc reagent. In the case that excess monohydric alcohol is used, volatile alcohols are preferred to facilitate removal of unreacted material.

The Zn compounds (a1), (a2) and (a3) may be obtained as an isolated solid powder (as for example described in EP 0 239 973 A2 and U.S. Pat. No. 5,326,852 A) or in the form of a slurry (as for example described in U.S. Pat. No. 6,979,722 B2) in solvent which slurry may be employed directly in the polymerization reaction.

Due to the air and moisture sensitivity of the Zn compounds (a1), (a2) and (a3) and their precursors conventional precautions are preferably taken to exclude water and oxygen from the system (unless water is a desired reactant, see for example U.S. Pat. No. 6,084,059). This may be accomplished by preparing and handling the Zn compounds in properly sealed apparatus together with an inert atmosphere such as nitrogen and often includes drying of the reagents such as solvents to remove trace moisture prior to preparation.

The catalyst additive component (b) comprises a metal compound (i) having alcoholate ligand(s) derived from one or monohydric alcohol and wherein the metal is selected from:

(I) group 2 metals such Mg, Ca, Sr, and Ba, preferably Mg, (II) Li, and (III) combinations of at least two metals selected from (I) and (II).

The monohydric alcohol from which the alcoholate ligand(s) of the metal compound (i) is/are derived is typically aliphatic or cycloaliphatic (preferably having 5 or 6 ring carbon atoms) or mixed aliphatic/cycloaliphatic comprising both an aliphatic and cycloaliphatic moieties (preferably having 5 or 6 ring carbon atoms). In other embodiments the monohydric alcohol is an aromatic alcohol including mixed aliphatic/aromatic alcohols comprising both aliphatic and aromatic moieties. Within the meaning of the present application the term "alcohol" explicitly includes phenols. The monohydric alcohol may comprise a hydrocarbon backbone with heteroatoms such as O and/or Si in its backbone or heteroatoms such as O, Si and/or halogen, e.g. F, as part of functional groups (e.g. methoxy or trifluoromethyl groups) pendant from the backbone. Preferably, the monohydric alcohol is an aliphatic alcohol, more preferably an alkanol (which can be straight-chain or branched), and even more preferably an alkanol comprising 1 to 20 carbon atoms, most preferably 3 to 12 carbons atoms. Illustrative examples of monohydric alcohols include ethanol, 1-propanol (n-propyl alcohol), 2-propanol (iso-propyl alcohol), 1-butanol (n-butyl alcohol), 2-methyl-1-propanol (iso-butyl alcohol), 2-butanol (sec-butyl alcohol), 2-metyhl-2-propanol (t-butyl alcohol), 2-ethylhexanol, octanol, nonanol, methoxypropanol, phenol, and methylphenols. The monohydric alcoholate ligand(s) of the metal compound (i) can be derived from a single monohydric alcohol or a mixture of at least two different monohydric alcohols. Preferably, the monohydric alcoholate ligand(s) of the metal compound (i) are derived from a single monohydric alcohol.

In some embodiments the metal compound (i) comprises only alcoholate ligand(s), i.e. the metal compound (i) is a metal alcoholate (b1) of one or more monohydric alcohols.

In other embodiments the metal compound (i) comprises non-alcoholate ligand(s) in addition to the alcoholate ligand(s), i.e. the metal compound (i) is a heteroleptic metal complex (b2) having alcoholate ligand(s) derived from one or more monohydric alcohols and non-alcoholate ligand(s). Examples of suitable non-alcoholate ligands include ethylacetoacetate ligand(s), and 2,4-pentanedionate ligand(s). The heteroleptic metal complex (b2) can comprises one single type of non-alcoholate ligand or mixtures of at least two different non-alcoholate ligands. Typically, the heteroleptic metal complex (b2) comprises only one type of non-alcoholate ligand.

Preferred embodiments of the metal compound (i) comprise the preferred alcoholate and/or non-alcoholate ligand(s) in combination with the preferred metals as described above.

Illustrative examples of metal compounds (b1) which may be used in the catalyst additive (b) of the present catalyst formulation are magnesium bis(2-ethylhexanolate) and lithium octanolate.

The structures of the metal compounds (b1) and (b2) including those preferred metal compounds (b1) and (b2) mentioned above are often complex and difficult to resolve. This especially applies to the heteroleptic metal complexes. Metal complexes having alcoholate ligands are frequently dimeric, oligomeric or even polymeric in structure with sometimes poorly defined structures and may experience transformations between different structures. Bridging of two metal atoms by one oxygen is known to occur. Thus, the metal compounds (b1) and (b2) described herein explicitly includes monomeric, dimeric, oligomeric and polymeric species.

The catalyst additive (b) of the present invention may comprise a single metal compound (i) or a mixture of different metal compounds (i).

A lot of metal compounds (b1) and (b2) are commercially available. Others can be prepared by routes such as reaction of hydrocarbyl metal precursors (such as di-n-butyl magnesium) with the appropriate stoichiometries of monohydric alcohol, or salt metathesis of the alkali salt (e.g. Li) of the deprotonated monohydric alcohol with the precursor metal chloride of interest.

Due to the air and moisture sensitivity of the metal compounds (b1) and (b2) and their precursors conventional precautions are preferably taken to exclude water and oxygen from the system. This may be accomplished by preparing and handling the metal compounds (b1) and (b2) in properly sealed apparatus together with an inert atmosphere such as nitrogen and often includes drying of the reagents such as solvents to remove trace moisture prior to preparation.

In some embodiments the metal compounds (i), including metal compounds (b1) and (b2) are soluble in a hydrocarbon solvent. Their preparation may result in a solution of the metal compound (i) in a hydrocarbon solvent which solution may be employed directly in the polymerization reaction.

The catalyst additive (b) may further contain an alcohol (ii) as an optional component. The term "alcohol" is used herein in contrast to the term "alcoholate" and designates an alcohol which is not deprotonated. Typically the alcohol (ii) is an aliphatic, cycloaliphatic or aromatic alcohol. It is preferred that the alcohol is monohydric. The alcohol, more specifically the monohydric alcohol, is preferably an aliphatic, cycloaliphatic (preferably having 5 or 6 ring carbon atoms) or mixed aliphatic/cycloaliphatic alcohol comprising both an aliphatic and cycloaliphatic moiety (preferably having 5 or 6 ring carbon atoms); an aromatic alcohol or a mixed aliphatic/aromatic alcohol comprising both aliphatic and aromatic moieties. More preferably, the alcohol, typically the monohydric alcohol, is an alkanol (which can be straight-chain or branched) and even more preferably, an alkanol comprising 1 to 20 carbon atoms, and most preferably 4 to 12 carbons atoms. Illustrative examples of alkanols include methanol, ethanol, 1-propanol (n-propyl alcohol, 2-propanol (iso-propyl alcohol), 1-butanol (n-butyl alcohol), 2-butanol (sec-butyl alcohol), 2-methyl-1-propanol (iso-butyl alcohol), 2-methyl-2-propanol (tert-butyl alcohol, 2-ethylhexanol, and octanol.

The catalyst additive (b) may comprise a single alcohol (ii) or a mixture of different alcohols (ii). The alcohol (ii) that is used in the catalyst composition (b) in addition to the metal compound (i) may be the same as the alcohol from which the alcoholate ligand(s) in metal compound (i) is/are derived. However, it is not mandatory that the alcohol (ii) corresponds to the alcoholate ligand(s) of metal compound (i).

It is not essential for the present invention whether and how the alcohol (ii) is bound to the metal compound (i)/the metal of the metal compound (i). In some cases the alcohol (ii) forms an adduct with the metal compound (i). A variety of alcohol adducts of metal alcoholates (b1) is commercially available. In other embodiments the alcohol (ii) is added to the metal compound (i) to become a component of the catalyst additive (b). The alcohol (ii) may also be formed in situ by adding water to the metal compound (i) to react with part of the alcoholate ligand(s) of the metal compound (i), typically metal alcoholate (b1).

The Zn alkoxide catalyst (a) can be used together with the catalyst additive (b) in a conventional process for polymerizing an epoxide, typically in a suspension polymerization process. The novel catalyst formulation of this invention is useful in effecting the polymerization of epoxide monomers which contain a cyclic group composed of two carbon atoms and one oxygen atom. Typically, these epoxide monomers can be characterized by the following formula:

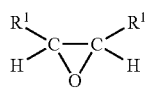

wherein each $R^1$, individually, can be hydrogen, haloaryl, or a hydrocarbon radical free from ethylenic and acetylenic unsaturation such as, for example, alkyl, aryl, cycloalkyl, aralkyl, or alkaryl radicals. In addition, both $R^1$ variables together with the epoxy carbon atoms, i.e. the carbon atoms of the epoxy group can represent a saturated cycloaliphatic hydrocarbon nucleus which contains from 4 to 10 carbon atoms, preferably from 4 to 8 carbon atoms, for example, a saturated cycloaliphatic hydrocarbon nucleus derived from cycloalkane, alkyl substituted cycloalkane, cyclobutane, cyclopentane, cyclohexane, cycloheptane, cyclooctane, methylcyclopentane, or amylcyclohexane. Illustrative $R^1$ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, and cycloheptyl.

A single epoxide monomer or an admixture of at least two different epoxide monomers can be employed as the monomeric feed. A broad range of epoxide monomers can be used in the polymerization process and representative expoxide monomers include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4-cyclo-hexyl-2,3-epoxypentane, chlorostyrene oxide, styrene oxide, ortho-, meta-, and para-ethylstyrene oxide, glycidyl benzene, the oxabicycloalkanes and alkyl-substituted oxabicycloalkanes, e.g., 7-oxabicyclo[4.1.0]heptane, oxabicyclo[3.1.0]hexane, 4-propyl-7-oxabicyclo[4.1.0]heptane, and 3-amyl-6-oxabicyclo[3.1.0]hexane.]

It is preferred that the epoxide monomer is an olefin oxide, more preferably an olefin oxide having 2 to 20 carbon atoms, such as for example ethylene oxide, propylene oxide, 1,2-epoxy-butane, or 2,3-epoxybutane. The most preferred monomer is ethylene oxide. Outstanding results are achieved in polymerizing ethylene oxide via that suspension polymerization route.

"Polymerization of an olefin oxide, preferably ethylene oxide" as used herein typically does not encompass the preparation of oligomers, such as polyethylene glycols and their mono- and diethers having a weight average molecular weight of less than 30,000, as determined by size exclusion chromatography. Accordingly, the term "polymerization of an olefin oxide, preferably ethylene oxide" typically means the preparation of a poly(olefin oxide), preferably poly(ethylene oxide), having a weight average molecular weight of at least 30,000, more preferably at least 50,000, and most preferably at least 80,000, as determined by size exclusion chromatography.

It is further understood that the catalytically active species that facilitate the polymerization of the epoxide monomer may be structurally different from the Zn compound of the Zn catalyst (a) and the metal compound (i) as they are present in the inventive catalyst formulation prior to addition to the starting materials of the polymerization reaction. In the reaction system the Zn compound of the Zn catalyst (a) and/or the metal compound (i) may react with other components which are present intentionally (e.g. the optional protonated alcohol (ii)) or unintentionally such as trace amounts of water (to form partially hydrolyzed alkoxides/alcoholates) to result in the catalytically active species.

The sequence of adding the Zn catalyst (a), the metal compound (i) and the optional alcohol (ii) to the reaction system is not essential. The Zn catalyst (a), the metal compound (i) and the optional alcohol (ii) may be premixed prior to addition to the reaction system to form a catalyst formulation or they may be added separately, either subsequently or at least two of them simultaneously. Continuous or semi-continuous addition of one or two or all of the Zn catalyst (a), the metal compound (i) and the optional alcohol (ii) is also possible.

The form in which the Zn catalyst (a) and the metal compound (i) are added to the reaction system is also not crucial. Typically, the Zn catalyst (a) is introduced in the form of a solution or suspension which may be obtained either directly from the preparation of the catalyst or by dissolving or dispersing the solid Zn catalyst (a) in an appropriate solvent. Suitable solvents include aliphatic hydrocarbons such as isopentane, hexane, octane, decane or dodecane. Typically, the metal compound (i) is introduced in the form of a solution or suspension which may be obtained either directly from the preparation of the catalyst or by dissolving or dispersing the solid metal compound (i) in an appropriate solvent. Again, suitable solvents include aliphatic hydrocarbons such as isopentane, hexane, octane, decane or dodecane.

In typical embodiments, the Zn catalyst (a) (including Zn compounds (a1), (a2), and (a3) and preferred embodiments mentioned before) is used in the polymerization of an epoxide monomer, such as ethylene oxide, in an amount providing 1 mol of Zn per 10 to 100,000 mol of epoxide monomer, preferably 1 mol of Zn per 10 to 50,000 mol of epoxide monomer, more preferably 1 mol of Zn per 100 to 20,000 mol of epoxide monomer, even more preferably 1 mol of Zn per 200 to 10,000 mol of epoxide monomer, and most preferably 1 mol of Zn per 250 to 5,000 mol of epoxide monomer or 1 mol of Zn per 250 to 2,500 mol of epoxide monomer.

The metal compound (i) (including metal compounds (b1) and (b2) and preferred embodiments mentioned before) is preferably used in an amount providing a molar ratio of metal of the metal compound (i) to Zn of the Zn catalyst (a) (including Zn compound (a1), (a2), and (a3) and preferred embodiments mentioned before) within the range of from 0.01:1 to 20:1, more preferably from 0.05:1 to 15:1, even more preferably from 0.05:1 to 10:1, most preferably from 0.05:1 to 8:1 or from 0.1:1 to 8:1.

When an alcohol (ii) is used together with the metal compound (i) as catalyst additive (b) the alcohol is preferably used in an amount providing a molar ratio of alcohol (ii) to metal of the metal compound (i) within the range of from 0.01:1 to 5:1, more preferably from 0.05:1 to 2:1, and most preferably from 0.1:1 to 0.5:1.

Accordingly, preferred embodiments of the catalyst formulation comprise the Zn catalyst (a) and the catalyst additive (b) in relative amounts realizing the above ratios, i.e., the Zn catalyst (a) and the metal compound (i) in amounts to provide a molar ratio of metal of the metal compound (i) to Zn of the Zn catalyst (a) within the range of from 0.01:1 to 20:1, more preferably from 0.05:1 to 15:1, even more preferably from 0.05:1 to 10:1, most preferably from 0.05:1 to 8:1 or from 0.1:1 to 8:1, and alcohol (ii) in an amount providing a molar ratio of alcohol (ii) to metal of the metal compound (i) within the range of from 0 to 5:1, preferably 0.01:1 to 5:1, more preferably from 0.05:1 to 2:1, and most preferably from 0.1:1 to 1:1.

The polymerization reaction can be conducted over a wide temperature range. Polymerization temperatures can be in the range of from −50 to 150° C. and depend on various factors, such as the nature of the epoxide monomer(s) employed, the particular catalyst employed, and the concentration of the catalyst. A typical temperature range is from 0 to 150° C. For the preparation of granular poly(ethylene oxide) a reaction temperature below 70° C. is preferred. Though granular poly(ethylene oxide) can be prepared at a reaction temperature of about 65 to 70° C. the poly(ethylene oxide) product tends to accumulate on the interior surfaces of the reaction equipment. Consequently, it is preferred that the reaction temperature for the preparation of granular poly(ethylene oxide) be in the range of from −30 to 65° C. and more preferably from 0 to 60° C.

The pressure conditions are not specifically restricted and can be adjusted by the temperature of the polymerization reaction, the vapor pressures of the inert diluents and monomer(s), and the pressure of inerting gas (e.g. nitrogen) introduced into the reactor.

In general, the reaction time will vary depending on the operative temperature, the nature of the epoxide oxide reagent(s) employed, the particular catalyst combination and the concentration employed, the use of an inert diluent, and other factors. Polymerization times can be run from minutes to days depending on the conditions used. Preferred times are 1 to 10 h.

When polymerizing an admixture containing two different epoxide monomers, the proportions of said epoxides can vary over the entire range.

The polymerization reaction preferably takes place in the liquid phase. Typically, the polymerization reaction is conducted under an inert atmosphere, e.g. nitrogen. It is also highly desirable to effect the polymerization process under substantially anhydrous conditions. Impurities such as water, aldehyde, carbon dioxide, and oxygen which may be present in the epoxide feed and/or reaction equipment should be avoided. The polymers of this invention can be prepared via the bulk polymerization, suspension polymerization, or the solution polymerization route, suspension polymerization being preferred.

The polymerization reaction can be carried out in the presence of an inert organic diluent such as, for example, aromatic hydrocarbons, benzene, toluene, xylene, ethylbenzene, and chlorobenzene; various oxygenated organic compounds such as anisole, the dimethyl and diethyl ethers of ethylene glycol, of propylene glycol, and of diethylene glycol; normally-liquid saturated hydrocarbons including the open chain, cyclic, and alkyl-substituted cyclic saturated hydrocarbons such as pentane (e.g. isopentane), hexane, heptane, octane, various normally-liquid petroleum hydrocarbon fractions, cyclohexane, the alkylcyclohexanes, and decahydronaphthalene.

Typical initial concentrations of ethylene oxide in the solvent range from 0.3 to 3 M, preferably from 0.3 to 2.5 M, more preferably from 0.4 to 2 M, and most preferably from 0.5 to 1.5 M (not considering the vapor-liquid equilibrium of ethylene oxide in the system). As those skilled in the art recognize, ethylene oxide polymerizations are extremely exothermic, and practitioners must consider heat removal (or temperature control) in the determination of run conditions. Initial concentrations may be achieved by an ethylene oxide precharge, added before the catalyst addition, or by an ethylene oxide charge following the catalyst introduction to the diluent.

The suspension polymerization can be conducted as a batch, semi-continuous, or a continuous process.

The single components of the polymerization reaction, i.e. the epoxide monomer, the Zn catalyst (a), the metal compound (i), the optional alcohol (ii) and the diluent, if used, may be added to the polymerization system in any practicable sequence as the order of introduction is not crucial for the present invention. However, should the Zn catalyst (a) and monomer be introduced prior to the addition of catalyst additive component (b), it is possible that some fraction of the product will not be influenced by the effect of catalyst additive (b). It may also be undesirable to add catalyst or additive to the reactor prior to the diluents, as these reagents may be difficult to disperse once they have contacted the reactor walls.

The present invention provides for new options in the polymerization of epoxide monomers such as ethylene oxide. It is quite surprising that the use of metal compounds (i) which themselves are not competent polymerization catalysts under standard reaction conditions in combination with a Zn catalyst (a) influences the polymerization mechanism. It is further unexpected that in some cases the presence of an additional alcohol (ii) in combination with the metal compounds (i) is not detrimental to the catalyst system as alcohol alone can be a potent catalyst poison, drastically dropping catalyst productivity. In some cases the inventive catalyst additives (b) may increase catalyst reactivity in terms of rate and/or productivity and/or allow for the synthesis of new polymer products. When compared to control reactions only comprising the Zn catalyst (a) but not containing the catalyst additive (b), in some embodiments the additive-containing polymerization reactions according to the present invention demonstrate enhanced reaction rate and productivity, and in certain embodiments they produce exceptionally high molecular weight materials, as determined by the viscosity of aqueous solutions. In other embodiments, when compared to control reactions not containing catalyst additive (b), the additive-containing reactions according to the present invention demonstrate comparable reaction rate and productivity, while producing lower molecular weight materials, as determined by the viscosity of aqueous solutions.

As the reaction mechanism is not completely understood it is difficult to predict the effect a specific claimed Zn catalyst/additive combination. Different additives effect the polymerization differently. Not only the nature of the catalyst additive (b) but also the specific ratio in which the single components of the catalyst system are used may control whether the additive acts as a rate and molecular weight enhancer or a molecular weight reducing (or limiting) agent. However, only a limited number of experiments are necessary to allow the person skilled in the art to identify some general trends in the system under consideration.

In some cases the catalyst additives (b) have the effect of enhancing the reactivity of the Zn catalyst (a) in terms of rate and/or productivity. Certain catalyst additives (b) have the effect of significantly increasing the molecular weight of the polymer product relative to catalyst runs without additives. Typically, with these types of catalyst additives polymer, especially poly(ethylene oxide), having molecular weights above 8,000,000 based on viscosity determination may be obtained. An increase of catalyst reactivity is typically achieved with embodiments wherein the catalyst additive (b) only comprises the metal alcoholate (i) but no additional alcohol (ii), i.e. no free alcohol has been added to the polymerization reaction. An exemplary class of catalyst additives (b) that act as reactivity and molecular weight enhancers are the alcoholates of Mg that are soluble in $C_5$-$C_{14}$ hydrocarbon solvents such as the magnesium alkoxide of 2-ethyl hexanol [$Mg(OC_8H_{17})_2$]. For some catalyst additives (b) such as for lithium octanolate little molecular weight enhancement is observed, but they still act as reactivity enhancers. Those exemplary additives (b) are used in combination with the Zn catalyst (a) as described above including the preferred embodiments.

In other cases the use of catalyst additives (b) in addition to the Zn catalyst (a) allows to directly synthesize lower molecular weight polymers while sometimes maintaining catalyst activity as measured by polymerization rate and catalyst productivity. In these cases the additive (b) acts as molecular weight reducing (or limiting) agent, i.e., some of the catalyst additives (b) are useful to facilitate the production of lower molecular weight polymers, especially lower molecular weight poly(ethylene oxide), if used in combination with the Zn catalyst (a). Typically with these types of catalyst additives, polymers, especially poly(ethylene oxide), having molecular weights of 100,000 to 2,000,000 based on viscosity determination may be obtained. The direct synthesis of lower molecular weight poly(ethylene oxide) is a significant progress in current ethylene oxide polymerization technology as techniques to control the molecular weight of poly(ethylene oxide) are lacking. Typically, reactor grades of poly(ethylene oxide) range in molecular weight from 4,000,000 to >8,000,000 based on viscosity determination. The polymer obtained must be irradiated to produce lower molecular weight grades (100,000 to 2,000,000). This additional process adds cost and effects long product cycle times. Embodiments wherein the Zn catalyst (a) is combined with a catalyst additive (b) comprising an additional alcohol (ii) as defined above in addition to the metal alcoholate (ii) typically act as molecular weight reducing agents, i.e. allow synthesis of polymer having lower molecular weight than obtained with the Zn catalyst (a) alone in absence of the additive. However, the presence of the alcohol (ii) is not mandatory to effect a reduction in molecular weight since this effect can also be observed in absence of an alcohol (ii). Exemplary catalyst additives (b) that act as molecular weight control agents are Mg alkoxides that are soluble in $C_5$-$C_{14}$ hydrocarbon solvents in combination with an alcohol (ii) such as the magnesium alkoxide of 2-ethyl hexanol [$Mg(OC_8H_{17})_2$] plus 2-ethyl hexanol. Those exemplary additives (b) are used in combination with the Zn catalyst (a) as described above including the preferred embodiments.

The above term "molecular weight based on viscosity determination" refers to an approximate molecular weight (rough molecular weight estimation) that is assigned to the polymer on the basis of its solution viscosity according to Table 1.

TABLE 1

| Approximate Molecular Weight | Weight Fraction of Polymer in Aqueous Solution | Brookfield Viscometer Spindle No. | Spindle speed (rpm) | Time from viscometer motor start to reading (min) | Viscosity range (mPa · s or cP) |
| --- | --- | --- | --- | --- | --- |
| >8,000,000 | 1% | 2 | 2 | 5 | >15,000 |
| 8,000,000 | 1% | 2 | 2 | 5 | 10,000-15,000 |
| 7,000,000 | 1% | 2 | 2 | 5 | 7,500-10,000 |
| 5,000,000 | 1% | 2 | 2 | 5 | 5,500-7,500 |
| 4,000,000 | 1% | 2 | 2 | 5 | 1,650-5,500 |
| 2,000,000 | 2% | 3 | 10 | 1 | 2,000-4,000 |
| 1,000,000 | 2% | 1 | 10 | 1 | 400-800 |
| 900,000 | 5% | 2 | 2 | 5 | 8,800-17,600 |
| 600,000 | 5% | 2 | 2 | 5 | 4,500-8,800 |
| 400,000 | 5% | 1 | 2 | 5 | 2,250-4,500 |
| 300,000 | 5% | 2 | 10 | 1 | 600-1,200 |
| 200,000 | 5% | 1 | 50 | 0.5 | 65-115 |
| 100,000 | 5% | 1 | 50 | 0.5 | 12-50 |

Viscosity values which do not exactly fit with the ranges specified in the last column but lie between those ranges correspond to intermediate values of molecular weight.

The viscosity is measured on water/isopropyl alcohol solutions of polymer at 25.0° C. using a Brookfield rotational viscometer with the viscometer settings for each molecular weight as indicated in Table 1. The term "1% aqueous solution viscosity" as used in the table means the dynamic viscosity of a 1 weight % solution of the polymer in a mixture of water and isopropyl alcohol. The same definition applies to 2 and 5% solutions. The weight percentage of polymer is based on the weight of water only, i.e. not including the isopropyl alcohol. Preparing the aqueous solutions of the polymers the isopropyl alcohol is added first in order to allow the polymer particles to disperse as individuals before water is added. This seems to greatly minimize gel formation and provides reliable viscosity measurements. The detailed procedure for dissolving the polymers is found in Bulletin Form No. 326-00002-0303 AMS, published March 2003 by the Dow Chemical Company and entitled "POLYOX™ Water-Soluble Resins Dissolving Techniques". The solution is prepared from material which passes through a 20 mesh screen in a clean, dry 800 mL low form beaker. (Virtually all of the product passes through the 20 mesh screen.) The appropriate amount of material is weighed into the beaker: 6.000 g for a 1 wt. % solution; 12.000 g for a 2 wt. % solution; or 30.000 g for a 5 wt. % solution. In a second beaker the required amount of high purity water is weighed (594 g for a 1 wt. % solution; 588 g for a 2 wt. % solution and 570 g for a 5 wt. % solution). To the polymer containing beaker is then added 125 mL of anhydrous isopropanol and the resulting mixture is slurried with a mechanical agitator (the agitator and additional experimental details are described more specifically in the above mentioned Dow bulletin). The stirrer is adjusted to move the bottom propeller as close to the bottom of the beaker as possible, and the mixture is stirred at 300-400 rpm in order to form a well distributed slurry. To this slurry is then added the appropriate premeasured amount of water in a continuous stream. The mixture is then stirred at 300-400 rpm for approximately 1 minute and then at 60 rpm for 3 hours. An appropriate beaker cover should be used to prevent evaporation during solution preparation. After the agitation procedure the solution is inspected for gels. If the solution contains significant gels it must be remade, as the viscosity measurement will be inaccurate. A person skilled in the art will recognize this phenomenon and understand its impact on rheological evaluation. If the solution is acceptable, it is incubated for 1 hour at 25.0° C. prior to the Brookfield viscosity measurement.

In preparation for the measurement the appropriate viscometer spindle is immersed in the polymer solution, avoiding entrapping air bubbles, and attached to the viscometer shaft. The height is adjusted to allow the solution level to meet the notch on the spindle. The viscometer motor is activated, and the viscosity reading is taken at a specified time interval following the start of the viscometer motor.

Some embodiments of the invention will now be described in detail in the following examples.

EXAMPLES

Solvents used in the examples (Isopar™E, hexanes, n-hexane, decane) were purified over activated A2 alumina to remove residual moisture. Isopar™E and hexanes were also purified over activated Q5 catalyst to remove residual oxygen.

The viscosities of the polymers referred to in the examples were measured on water/isopropyl alcohol solutions of polymer at 25.0° C. using a Brookfield rotational viscometer with the viscometer settings as indicated in Table 1. The corresponding solutions were prepared as described above.

Reference Example 1

Preparation of Zinc Alkoxide Catalyst in Isopar™ (Heteroleptic Zn Alcoholate of 1,4-Butanediol and Ethanol)

A zinc alkoxide catalyst was prepared guided by the description provided in U.S. Pat. No. 6,979,722 B2, Example 1. A 250 mL flask was set up in an inert atmosphere glovebox and charged with Isopar™ E (isoparaffinic fluid, CAS 64741-66-8) (80 mL) and diethyl zinc (5.0 mL, 48.8 mmol). To this solution, 1,4-butanediol (3.5 mL, 39.5 mmol, dried over molecular sieves) was added dropwise with vigorous stirring. A white precipitate formed immediately. The solution was stirred at room temperature for 1 h, heated to 50° C. for 1 h, and then stirred overnight at room temperature. The following day anhydrous ethanol (3.7 mL, 63.4 mmol) was dripped into the solution. The solution was then heated to 40° C. for 1 h, followed by heating to 150° C. for 1 h. At this temperature, volatile components from the solution (including some of the Isopar™ E) were distilled off. After cooling, the final slurry volume was adjusted to 120 mL with Isopar™ E, to give a Zn concentration of 0.4 M. This catalyst preparation was used in the described polymerization reactions, and is subsequently described as "zinc alkoxide catalyst." The catalyst was always kept in an inert atmosphere glove box, and solutions for use in the polymerization reactions were also prepared in the glovebox. Catalyst solutions were sealed in serum-type vials for transport to the reactor and were delivered to the reaction solution by syringing out of the sealed vials and injecting into the sealed reactor in order to minimize air exposure.

Reference Example 2

Preparation of Magnesium Alkoxide Additive

Magnesium-bis-(2-ethylhexanolate) was prepared in an inert atmosphere glovebox in hexanes from 15.0 mL of a 1.28 M hexanes solution of 2-ethylhexanol (19.2 mmol) and 9.6 mL of 1M di-n-butylmagnesium in heptane (9.6 mmol).

Reference Example 3

Preparation of Lithium Alkoxide Additive

Lithium octanolate was prepared under inert atmosphere by the addition of 2M n-butyllithium in cyclohexane (4.8 mL, 9.6 mmol) to a hexane solution (50 mL) of anhydrous octanol (1.550 mL, 9.80 mmol).

Comparative Example 4a

Polymerization of Ethylene Oxide with Zn Alkoxide Catalyst

A glass 2 L reactor equipped with a condenser system, ethylene oxide (EO), feed line, over head stirrer, and septum sealed port for catalyst addition, was dried overnight under a nitrogen flow at elevated temperature. After cooling, the inerted reactor was charged with 700 mL of isopentane and 1.5 g of CAB-O-SIL® TS-720 hydrophobically modified silica (commercially available from Cabot Corporation) and equilibrated to 38° C. and 89.6 kPa (13 psi). An ethylene oxide precharge of 34 g was added to the reactor, followed by injection through the septum port of 6 mL of the 0.4 M zinc alkoxide catalyst slurry prepared in Reference Example 1. Ethylene oxide was continuously fed into the reactor until 100 g total had been added. The rate of ethylene oxide addition was adjusted so that the calculated solution concentration of ethylene oxide would stay below 7 wt. %. After 285 min, 1.5 mL of isopropyl alcohol were charged into the reactor and the reactor was cooled. The solid polymer product was isolated by filtration, dried in a vacuum oven over night at room temperature, and stabilized with 500 ppm butylhydroxytoluene (BHT). The poly(ethylene oxide) (PEO) yield was 73.3 g. A 1 wt. % aqueous solution of the polymer product was determined to have a viscosity of 3,400 mPa·s (spindle no. 2, 2 rpm, 5 min measurement time).

Comparative Example 4b

Polymerization of EO with Zinc Alkoxide Catalyst

EO polymerization was carried out as described in Comparative Example 4a. Here the catalyst solution was injected into a reactor precharged with 30 g of ethylene oxide. After 268 min, the EO solution concentration was 2.6 wt. %, 1.5 mL of isopropyl alcohol were charged into the reactor at this time and the reactor was cooled. The polymer was isolated and stabilized as described in Comparative Example 4a. The PEO yield was 80.8 g. A 1 wt. % aqueous solution of the polymer product was determined to have a viscosity of 4860 mPa·s (spindle no. 2, 2 rpm, 5 min measurement time).

Example 5

Polymerization of EO with Zinc Alkoxide Catalyst and Magnesium Alkoxide Additive EO polymerization was carried out as described in Comparative Example 4a. Here, the catalyst was pre-mixed with an additive solution before being added to the EO charged reactor. After the di-n-butylmagnesium and 2-ethylhexanol reagents reacted to form magnesium-bis-(2-ethylhexanolate) as described in Reference Example 2, 6 mL of 0.4 M zinc alkoxide catalyst slurry of Reference Example 1 were added to the solution. The resulting mixture was sealed in a serum vial for transport to the reactor, and the catalyst/additive solution was injected into a reactor precharged with 40 g of EO. After 100 min, the EO solution concentration was 0.1 wt. %, 1.5 mL of isopropyl alcohol were charged into the reactor at this time and the reactor was cooled. The polymer was isolated and stabilized as described in Comparative Example 4a. The PEO yield was 94.9 g. A 1 wt. % aqueous solution of the polymer product was determined to have a viscosity of 17,900 mPa·s (spindle no. 2, 2 rpm, 5 min measurement time).

Example 6

Polymerization of EO with Zinc Alkoxide Catalyst and Lithium Alkoxide Additive 2-3 hours prior to the polymerization reaction 6 mL of zinc alkoxide catalyst slurry of Reference Example 1 were injected into a solution of lithium octanolate of Reference Example 3. EO polymerization was carried out as described in Comparative Example 4a except that the zinc alkoxide catalyst plus lithium additive solution was used instead of zinc alkoxide catalyst alone. The EO precharge was 36 g. After 117 min, 1.5 mL of isopropyl alcohol were charged into the reactor and the reactor was cooled. The polymer was isolated and stabilized as described in Comparative Example 4a. The PEO yield was 99.0 g. A 1 wt. % aqueous solution of the polymer product was determined to have a viscosity of 3,360 mPa·s (spindle no. 2, 2 rpm, 5 min measurement time).

Figure 2:
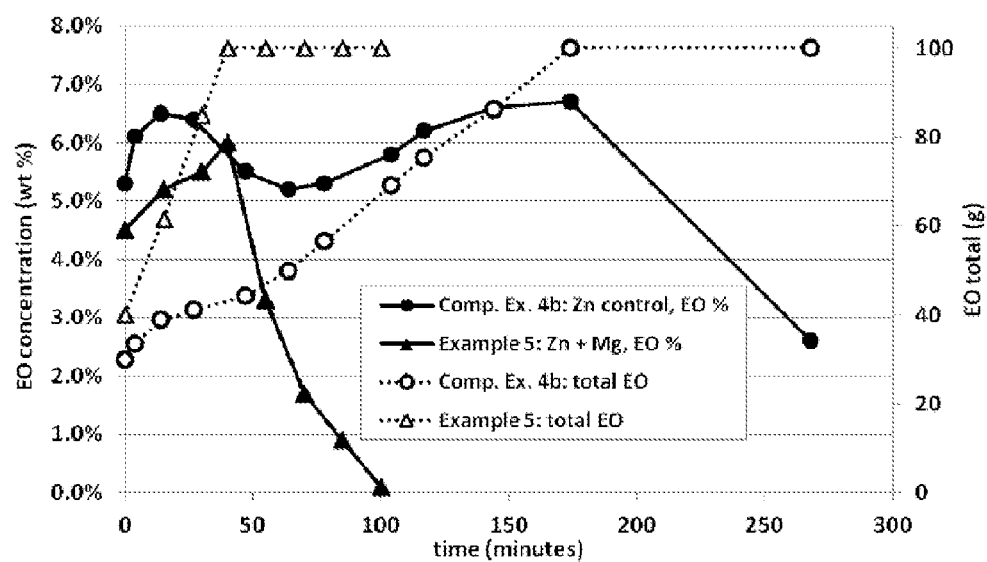

FIG. 1 and FIG. 2 illustrate the EO polymerizations described in Examples 6 and 5 in comparison to Comparative Example 4a and 4b, respectively. In these plots total EO (right axis, in grams) and EO solution concentration (left axis, in wt %) (as determined by a vapor liquid equilibrium model) are plotted as a function of the reaction time.

The plots start with the introduction of catalyst (t=0) and end with the isopropanol reaction quench. A total of 100 g of EO was added to each run.

FIG. 1 is a comparison of Example 6 and Comparative Example 4a.

FIG. 2 is a comparison of Example 5 and Comparative Example 4b.

It is evident from both figures that the EO is consumed much faster when a catalyst additive is present in addition to the Zn alkoxide catalyst (Examples 5 and 6 according to the present invention) than in the presence of zinc alkoxide catalyst alone (Comparative Example 4a and 4b). In Example 6 EO is consumed as fast as it is fed, never increasing above about 4.5% solution concentration. After 117 min, virtually all of the added EO is consumed (final concentration is 0.2%), and the reaction is quenched. In Comparative Example 4a, EO must be added to the reactor at a slower rate and approaches 7% solution concentration. After 285 min, the solution concentration is 2.4% and the reaction is quenched. Similarly for Example 5, a full 100 g of EO is consumed in 100 min (final EO concentration is 0.1%), much faster than in Comparative Example 4b.

Example 7

Polymerization of EO with Zinc Alkoxide Catalyst and Magnesium-Bis-(2-Ethylhexanolate) Plus 2-Ethylhexanol EO polymerization was carried out as described in Comparative Example 4a. Similar to Example 5 the zinc alkoxide catalyst slurry of Reference Example 1 was pre-mixed with the additive before being added to the EO charged reactor. Here, the additive was prepared in hexanes as in Reference Example 2 except that an excess of 2-ethylhexanol was used (22 mL (instead of 15 mL) of a 1.28 M hexanes solution (28 mmol) of 2-ethylhexanol) resulting in the presence of unreacted 2-ethylhexanol. After the di-n-butylmagnesium and 2-ethylhexanol reagents reacted to form magnesium-bis-(2-ethylhexanolate) plus 2-ethylhexanol, 6 mL of 0.4 M zinc alkoxide catalyst (2.4 mmol) were added to the solution. The resulting slurry was sealed in a serum vial for transport to the reactor. Here the catalyst/additive solution was injected into a reactor precharged with 40 g of EO. After 276 min, 1.5 mL of isopropyl alcohol were charged into the reactor and the reactor was cooled. The polymer was isolated and stabilized as described in Example 4a. The PEO yield was 59.8 g. A 1 wt. % aqueous solution of the polymer product was determined to have a viscosity of 80 mPa·s (well below the 1 wt. % analysis scale), while a 2 wt % aqueous solution gave a viscosity of 383 mPa·s (spindle no. 1, 10 rpm, 1 min measurement time), and a 5 wt. % aqueous solution gave a viscosity of 14,920 mPa·s (spindle no. 2, 2 rpm, 5 min measurement time).

Example 8

Polymerization of EO with Zinc Alkoxide Catalyst and Lithium Octanolate Additive Plus Octanol EO polymerization was carried out as described in Comparative Example 4a. Similar to Example 6 the zinc alkoxide catalyst slurry of Reference Example 1 was pre-mixed with the additive before being added to the EO charged reactor. Here, the additive was prepared in hexanes as in Reference Example 3 except that an excess of octanol was used (11.1 mmol instead of 9.8 mmol) resulting in the presence of unreacted octanol. After the n-butyllithium and octanol reagents reacted to form lithium-octanolate plus octanol, 8 mL of 0.4 M zinc alkoxide catalyst (3.2 mmol) were added to the solution. The resulting slurry was sealed in a serum vial for transport to the reactor. Here the catalyst/additive solution was injected into a reactor precharged with 28 g of EO. After 180 min, 1.5 mL of isopropyl alcohol were charged into the reactor and the reactor was cooled. The polymer was isolated and stabilized as described in Comparative Example 4a. The PEO yield was 90.3 g. A 1 wt. % aqueous solution of the polymer product was determined to have a viscosity of 240 mPa·s (spindle no. 2, 2 rpm, 5 min measurement time).

It is evident from the solution viscosities of the PEOs obtained that the catalyst additive of Examples 5 acts as molecular weight enhancer whereas the catalyst additives of Examples 7 and 8 act as molecular weight reducing (limiting) agents. In addition, the catalyst additives of Examples 5 and 6 contribute significant rate enhancement of the EO polymerization reaction relative to Zn catalyst only experiments.

What is claimed is:

1. A catalyst formulation comprising:
   (a) a Zn catalyst comprising a Zn compound having alcoholate ligand(s) derived from one or more polyols, and
   (b) a catalyst additive comprising a metal compound (i) having alcoholate ligand(s) derived from one or monohydric alcohol wherein the metal is selected from:
      (I) group 2 metals,
      (II) Li, and
      (III) combinations of at least two metals selected from (I) and (II).

2. The catalyst formulation of claim 1 wherein the Zn compound of the Zn catalyst (a) is selected from:
   (a1) a Zn alcoholate of one or more polyols, and
   (a2) a heteroleptic Zn alcoholate of one or more polyols and one or more monohydric alcohols and/or water.

3. The catalyst formulation of claim 2 wherein the Zn catalyst (a) comprises a Zn alcoholate (a1) of one or more polyols and a Zn alcoholate (a3) of one or more monohydric alcohols.

4. The catalyst formulation of claim 1 wherein the Zn catalyst (a) comprises a Zn compound having alcoholate ligand(s) derived from one or more diols.

5. The catalyst formulation of claim 2 wherein the Zn compound of the Zn catalyst (a) is a heteroleptic Zn alcoholate (a2) of one or more polyols and one or more monohydric alcohols selected from monohydric aliphatic alcohols including monohydric halosubstituted aliphatic alcohols.

6. The catalyst formulation of claim 5 wherein the Zn compound of the Zn catalyst (a) is a heteroleptic Zn alcoholate (a2) of 1,4-butanediol and ethanol.

7. The catalyst formulation of claim 1 wherein the catalyst additive (b) comprises a metal compound (i) having alcoholate ligand(s) derived from one or monohydric aliphatic, cycloaliphatic or mixed aliphatic/cycloaliphatic alcohols.

8. The catalyst formulation of claim 1 wherein the metal compound (i) of the catalyst additive (b) is selected from:
   (b1) a metal alcoholate of one or more monohydric alcohols, and
   (b2) a heteroleptic metal complex having alcoholate ligand(s) derived from one or more monohydric alcohols and non-alcoholate ligand(s).

9. The catalyst formulation of claim 1 wherein the catalyst additive additionally comprises (ii) a monohydric alcohol.

10. A process for polymerizing an epoxide monomer comprising carrying out the process in the presence of a catalyst formulation comprising:
    (a) a Zn catalyst comprising a Zn compound having alcoholate ligand(s) derived from one or more polyols, and
    (b) a catalyst additive comprising a metal compound (i) having alcoholate ligand(s) derived from one or monohydric alcohol wherein the metal is selected from:
       (I) group 2 metals,
       (II) Li, and
       (III) combinations of at least two metals selected from (I) and (II).

11. The process of claim 10 wherein a poly(olefin oxide) having a weight average molecular weight of at least 30,000 is prepared.

12. The process of claim 10 wherein a poly(ethylene oxide) is prepared.

13. The process of claim 11 wherein a poly(ethylene oxide) is prepared.

* * * * *